(12) United States Patent
Chopp, Jr. et al.

(10) Patent No.: US 7,568,871 B2
(45) Date of Patent: Aug. 4, 2009

(54) DATA CENTER CABINET BONDING STUD

(75) Inventors: Joseph A. Chopp, Jr., New Lenox, IL (US); James M. Arredondo, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 296 days.

(21) Appl. No.: 11/625,900

(22) Filed: Jan. 23, 2007

(65) Prior Publication Data
US 2007/0177959 A1 Aug. 2, 2007

Related U.S. Application Data

(60) Provisional application No. 60/762,678, filed on Jan. 27, 2006.

(51) Int. Cl.
*F16B 35/00* (2006.01)
(52) U.S. Cl. ........................... 411/389; 411/107
(58) Field of Classification Search ........... 411/388, 411/389, 107, 116, 121, 124, 144, 176, 180, 411/184, 133, 939; 439/439, 801, 765–767
See application file for complete search history.

(56) References Cited

U.S. PATENT DOCUMENTS

| | | | |
|---|---|---|---|
| 1,855,447 A | 4/1932 | Hagstedt | |
| 2,017,493 A | 10/1935 | Glowacki | |
| 2,741,289 A * | 4/1956 | Grow | ............ 411/185 |
| 3,255,797 A | 6/1966 | Attwood | |
| 3,383,646 A | 5/1968 | Otto | |
| 3,535,678 A | 10/1970 | Gulistan | |
| 3,640,326 A | 2/1972 | Brown | |
| 3,850,501 A * | 11/1974 | Butterfield et al. | ......... 439/196 |
| 3,861,774 A | 1/1975 | Willis | |
| 4,071,067 A | 1/1978 | Goldby | |
| 4,170,069 A * | 10/1979 | Katsanevas | ............... 33/199 R |
| 4,223,585 A * | 9/1980 | Barth et al. | .................. 411/389 |
| 4,304,503 A | 12/1981 | Gehring et al. | |
| 4,410,226 A | 10/1983 | Adduci et al. | |
| 4,486,058 A | 12/1984 | Takagi et al. | |
| 4,744,765 A | 5/1988 | DeLeo | |
| 4,764,066 A | 8/1988 | Terrell et al. | |
| 4,820,235 A | 4/1989 | Weber et al. | |
| 5,207,588 A * | 5/1993 | Ladouceur et al. | ............ 439/84 |
| 5,441,417 A | 8/1995 | Ladouceur et al. | |
| 5,442,133 A | 8/1995 | Arnold et al. | |

(Continued)

FOREIGN PATENT DOCUMENTS

EP 0641944 A1 3/1995

(Continued)

*Primary Examiner*—Gary Estremsky
(74) *Attorney, Agent, or Firm*—Robert A. McCann; Christopher S. Clancy (57) ABSTRACT

A bonding stud for a data center cabinet comprises a body adapted to geometrically conform to a cage nut hole within the cabinet. The body may comprise opposing threaded studs and an annular shoulder that extends outward from the body to provide contact and bonding with ground strips used in connection with the data center cabinet. Projections formed between the shoulder and the sides of the body may penetrate the surface of the frame rails of the data center cabinet to provide a bond to the base metal of the frame rails.

9 Claims, 6 Drawing Sheets

U.S. PATENT DOCUMENTS

| | | |
|---|---|---|
| 5,487,685 A | 1/1996 | Stillbäck et al. |
| 5,639,268 A * | 6/1997 | Julian et al. ................. 439/737 |
| 5,644,830 A * | 7/1997 | Ladouceur et al. ......... 29/432.2 |
| 5,928,006 A | 7/1999 | Franks, Jr. |
| 6,186,717 B1 | 2/2001 | Cosenza |
| 6,241,444 B1 | 6/2001 | Clarke |
| 6,450,842 B1 | 9/2002 | Matsuda et al. |
| 6,647,608 B2 * | 11/2003 | Wojciechowski et al. ..... 29/515 |
| 6,746,285 B2 | 6/2004 | Delcourt et al. |
| 2004/0106309 A1 | 6/2004 | Larsson et al. |

FOREIGN PATENT DOCUMENTS

| | | |
|---|---|---|
| WO | 9300517 | 1/1993 |
| WO | 02067383 A1 | 8/2002 |

* cited by examiner

DATA CENTER CABINET BONDING STUD

CROSS-REFERENCE TO RELATED APPLICATION

This application claims priority to Provisional Application No. 60/762,678, filed Jan. 27, 2006, which is hereby incorporated by reference in its entirety.

FIELD OF INVENTION

This invention relates to bonding studs and, more particularly, to bonding studs for connecting various parts of a data center cabinet to aid in grounding the data center cabinet.

BACKGROUND

There is a need for a data cabinet grounding solution that can provide a sufficient electrical bond between the front and back frame rails and other parts of a data cabinet or rack, with or without occupying a full rack unit.

SUMMARY OF THE INVENTION

The present invention relates to a bonding stud and to data center cabinets or racks employing a bonding stud.

In one embodiment, the present invention is directed to a bonding stud comprising a body dimensioned to geometrically conform to a cage nut hole within a data center cabinet. A first threaded stud may extend from a first surface of the body and a second threaded stud may extend from a second surface of the body, opposite the first threaded stud. The body may further comprise a stop surface, in the form of an annular shoulder, extending outwardly from the body, as well as a plurality of teeth-like projections, each of which may comprise a first surface in contact with the body and a second surface in contact with the shoulder. The shoulder may extend transversely to a longitudinal axis of the first and second studs, and the teeth may be positioned between the first and second studs.

In another embodiment, the present invention is directed to a data center cabinet comprising a pair of front frame rails, a pair of rear flame rails, a ground bar connecting the rear frame rails and the above-described bonding stud. The front and real frame rails may be connected to a ground strip and a front to back jumper wire, by bonding studs and ground nuts. Additionally, each of the rear frame rails may be connected to the ground bar by bonding studs and ground nuts.

BRIEF DESCRIPTION OF THE DRAWINGS

Certain embodiments of the present invention are illustrated by the accompanying figures. It should be understood that the figures are not necessarily to scale and that details not necessary for an understanding of the invention or that render other details difficult to perceive may be omitted. It should be understood, of course, that the invention is not necessarily limited to the particular embodiments illustrated herein.

DETAILED DESCRIPTION

Figure 1:
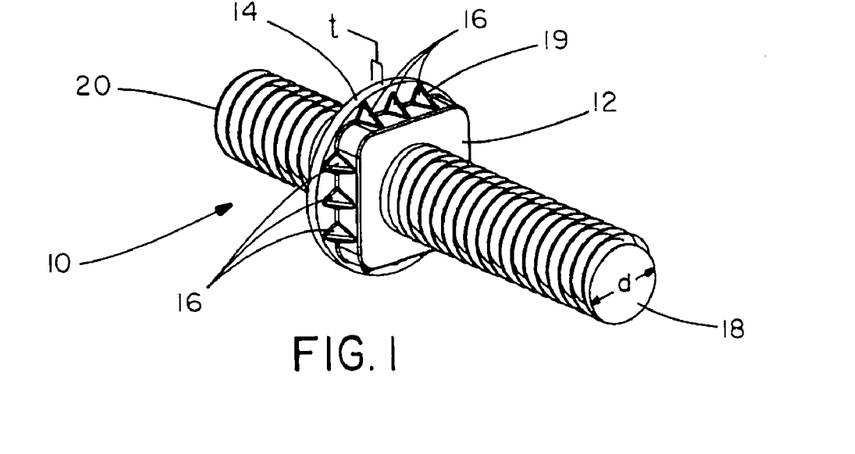
FIG. 1 is a rear perspective view of one embodiment of the bonding stud of the present invention.
Figure 2:
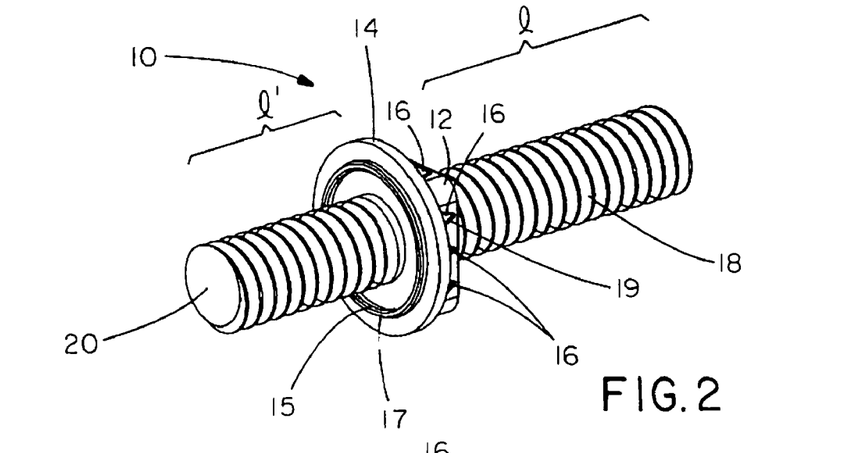
FIG. 2 is a front perspective view of one embodiment of the bonding stud of the present invention.
Figure 3:
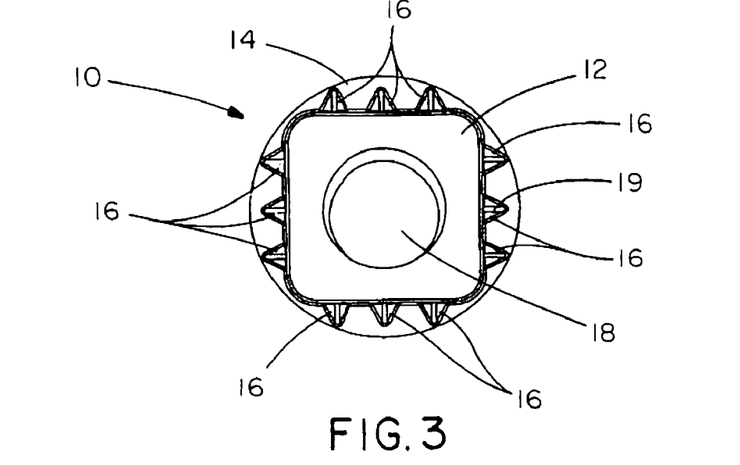
FIG. 3 is a front elevation view of one embodiment of the bonding stud of the present invention.

Referring now to FIGS. 1-3, one embodiment of the bonding stud 10 of the present invention is shown. Bonding stud 10 includes body 12, dimensioned to geometrically conform to and sized to fit within a cage nut hole within a data cabinet. As used herein, geometrically conform means that body 12 exhibits the same geometric shape as a corresponding cage nut hole. The configuration of body 12 advantageously allows bonding stud 10 to resist torque from nuts used with bonding stud 10, thereby preventing loosening of the nuts. As shown in FIG. 1, body 12 includes a square-shaped cross-section. Of course, body 12 may exhibit different shapes to adapt to differently shaped cage nut holes.

Stop surface, in the form of annular shoulder 14, extends from body 12 and provides a positive stop against the frame rail of a data center cabinet or rack. One or more projections 16 may extend from annular shoulder 14 and body 12. That is, projections 16 may include a first portion affixed to or in contact with annular shoulder 14 and a second portion affixed to or in contact with body 12. Alternatively, projections 16 may extend from the surface of shoulder 14, without contacting body 12, or could project from body 12, without contacting the surface of shoulder 14. Shoulder 14 can have any shape desired, and may include a thickness t slightly thicker than the shell of a common cage. This helps ensure that a ground strip can be clamped and bonded to bonding stud 10.

As shown in FIG. 2, projections 16 may further comprise cutting surface 19, adapted to cut through paint or other non-conductive surfaces, if present, such as those on data center cabinet frame rails and also to create a bond between bonding stud 10 and the base metal of the surface it contacts. The size, shape, number and position of projections 16 may vary depending on the contemplated use. Four to twelve projections is typical.

First threaded stud 18 extends from one surface of body 12 and second threaded stud 20 extends from a second surface of body 12, opposite first threaded stud 18. Annular rib 15, comprising edge 17, also extends from annular shoulder 14. The compact size of bonding stud 10 allows it to fit within a frame rail of a data center cabinet. It need not use a rack unit, allowing total rack space in the data center cabinet to be used for equipment.

Bonding stud 10 may be cast or cold-headed out of an electrically conductive material, such as steel. After bonding stud 10 is fashioned, heating in a ceramic furnace with charcoal powder may optionally follow. Heating at a temperature between about 1.500° F. and about 1,900° F. followed by quenching, increases the hardness of bonding stud 10. Hardness of bonding stud 10 can be determined with a Rockwell scale, which measures the indentation hardness of materials through the depth of penetration of an indenter. Bonding studs 10 of the present invention may exhibit hardness measurements between about 25.0 HR and about 80.0 HR. typically between about 45.0 HR and about 60.0 HR.

The dimensions of bonding stud 10 may vary. A length l of first threaded stud 18 may be between about 0.5 inches and 1.0 inch, more particularly between about 0.7 inches to 0.8 inches and typically about 0.75 inches. A length l' of second threaded stud 20 may be between about 0.25 inches to 0.75 inches, more particularly between about 0.3 inches to about 0.7 inches and typically about 0.5 inches. Either of first and second studs 18 and 20 may exhibit a diameter d between about 0.15 inches to about 0.30 inches, more particularly about 0.2 inches. Each side of body 12, excluding projections 16, may be between about 0.2 inches to 0.4 inches in length, more particularly between about 0.3 inches to 0.35 inches and typically about 0.35 inches. Diameter of annular shoulder 14 may be between about 0.4 inches to 0.5 inches, more particularly between about 0.45 inches to 0.47 inches Thickness t of annular shoulder 14 may be between about 0.025 inches to about 0.040 inches.

Bonding stud 10 is typically used to mount certain components to a data center cabinet 30, helping to establish and maintain electrical connections throughout. Referring to FIGS. 4-9, one embodiment of a data center cabinet 30 using bonding stud 10 is shown. Cabinet 30 may include front and rear frame rails 32 and 34, each of which includes numerous cage nut holes 36 typically square in shape, copper ground strip 40, front to rear jumper wires 44, which comprise terminal ends 46 comprising apertures 51, and one ground bar 48.

Figure 4:
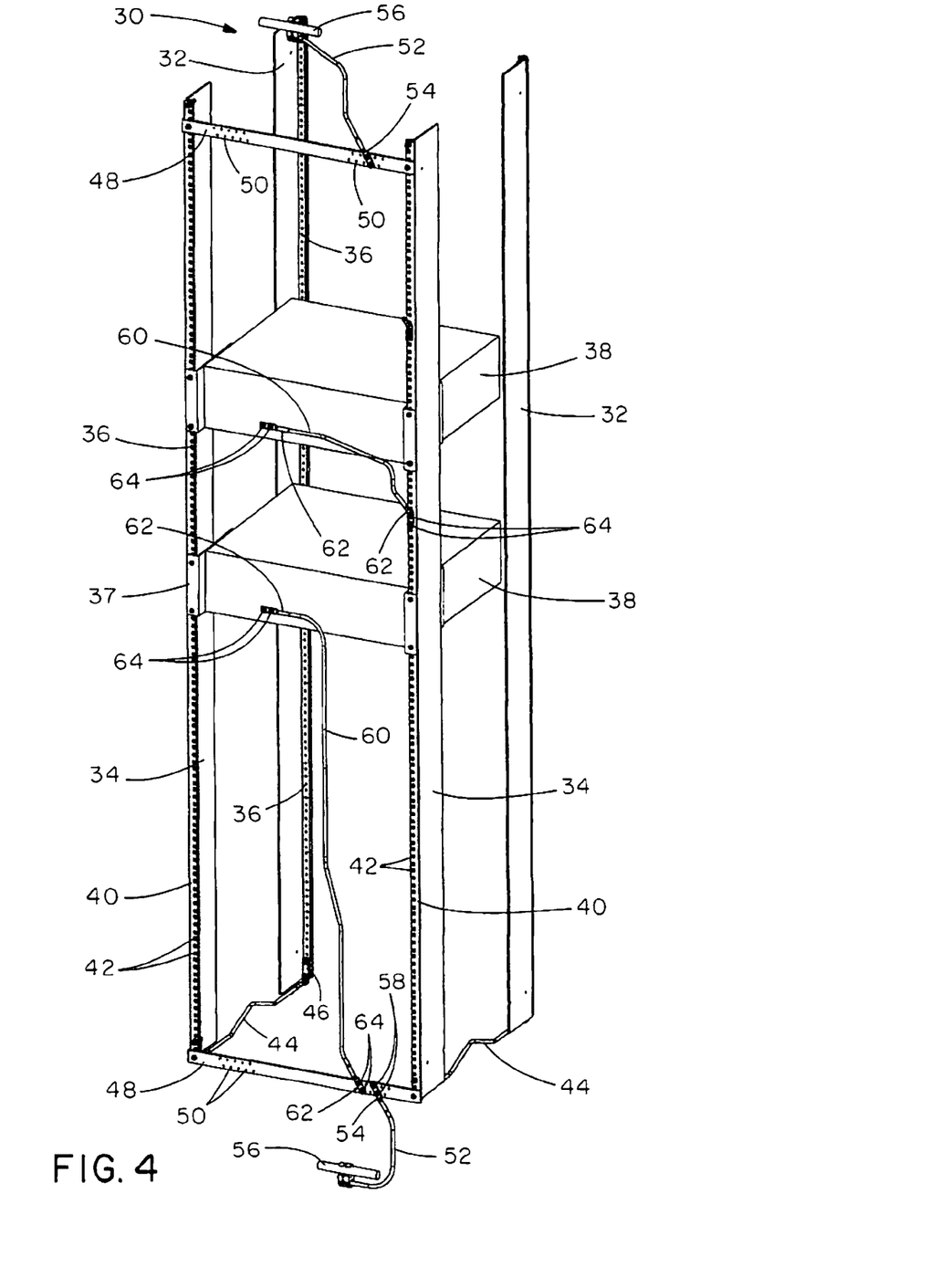
FIG. 4 is a rearward perspective view of one embodiment of the data center cabinet with the bonding stud of FIG. 1.

Although FIG. 4 shows two ground bars 48, one on the top and one on the bottom of cabinet 30, only one ground bar 48 is required. If used in an underfloor environment, ground bar 48 is located at the bottom of cabinet 30. Conversely, if used in an overhead environment, ground bar 48 is located at the top of cabinet 30.

Bonding stud 10 and bonding nuts 11 may be used to secure (1) ground strips 40 and jumper wires 44 to front and rear frame rails 32 and 34, (2) ground bar 48 to rear frame rails 34 and (3) equipment 38 to front and rear frame rails 32 and 34. In particular, first threaded stud 18 may be used to secure jumper wires 44 to front and rear frame rails 32 and 34. Second threaded stud 20 may be used to secure ground strip 40 and ground bar 48 to rear frame rails 34. Second threaded stud 20 may also be used to secure equipment 38 to front and rear frame rails 32 and 34.

Figure 5:
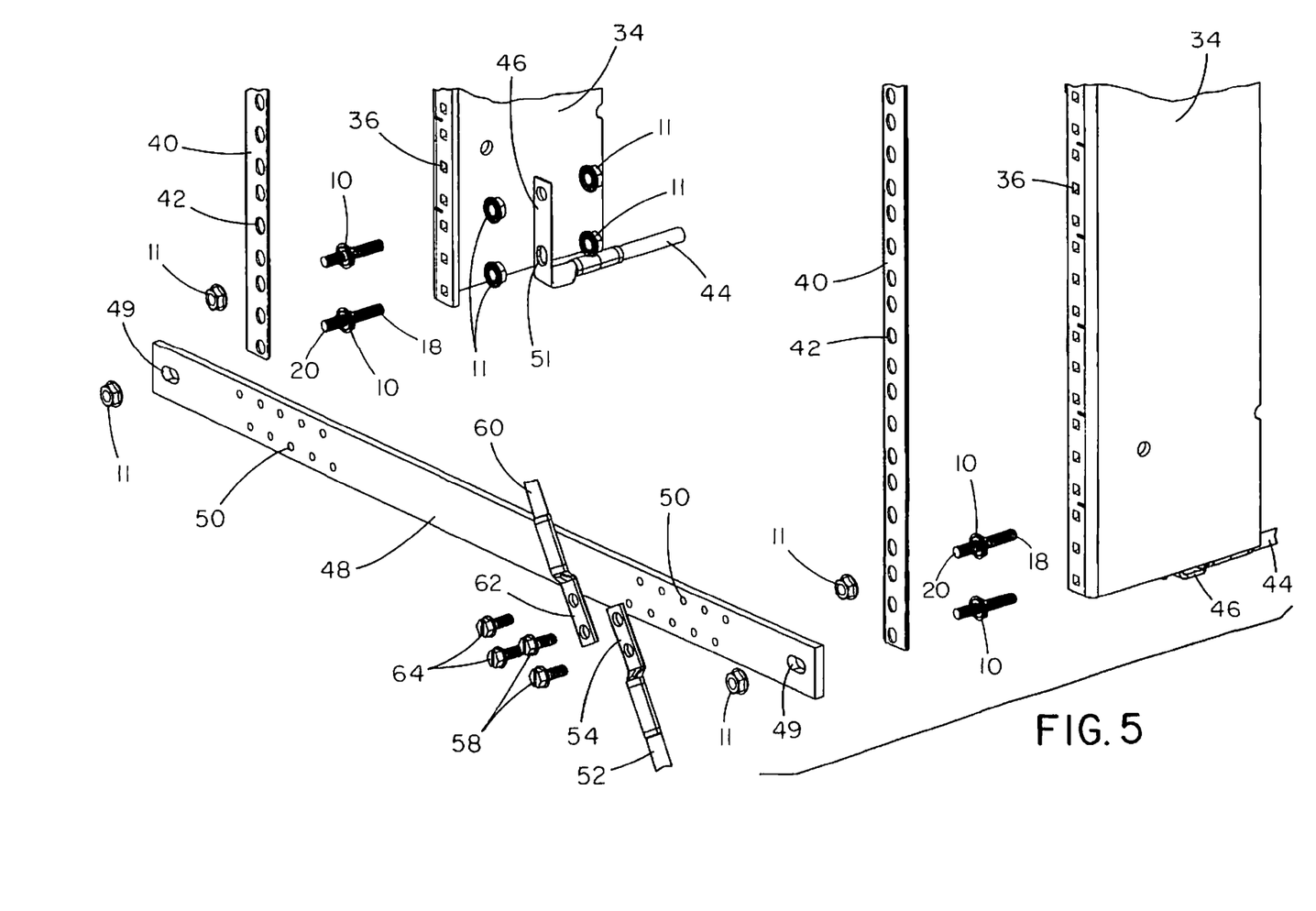
FIG. 5 is an enlarged exploded rear perspective view of the data center cabinet of FIG. 4.
Figure 6:
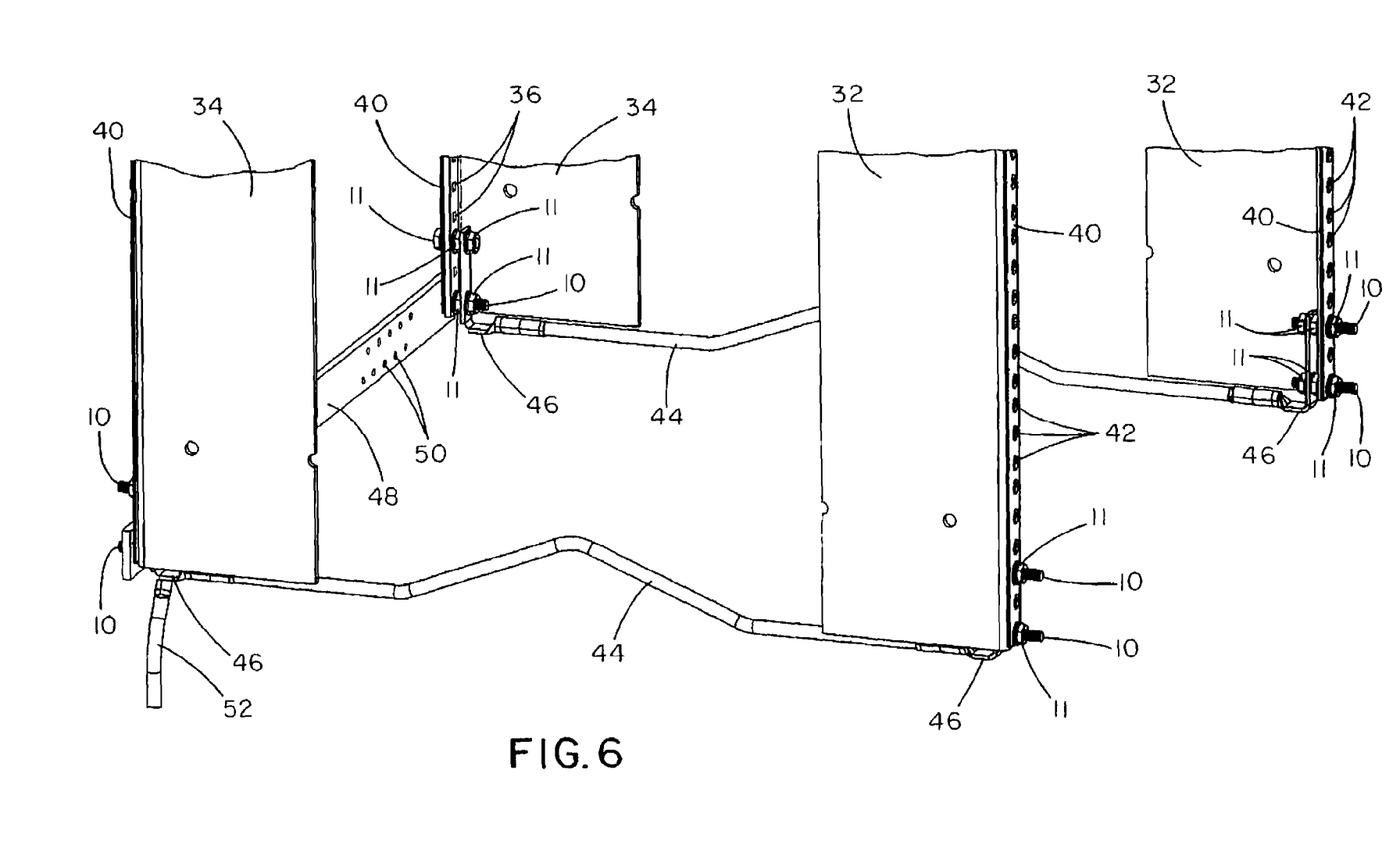
FIG. 6 is an enlarged partial side perspective view of the data center cabinet of FIG. 4.
Figure 7:
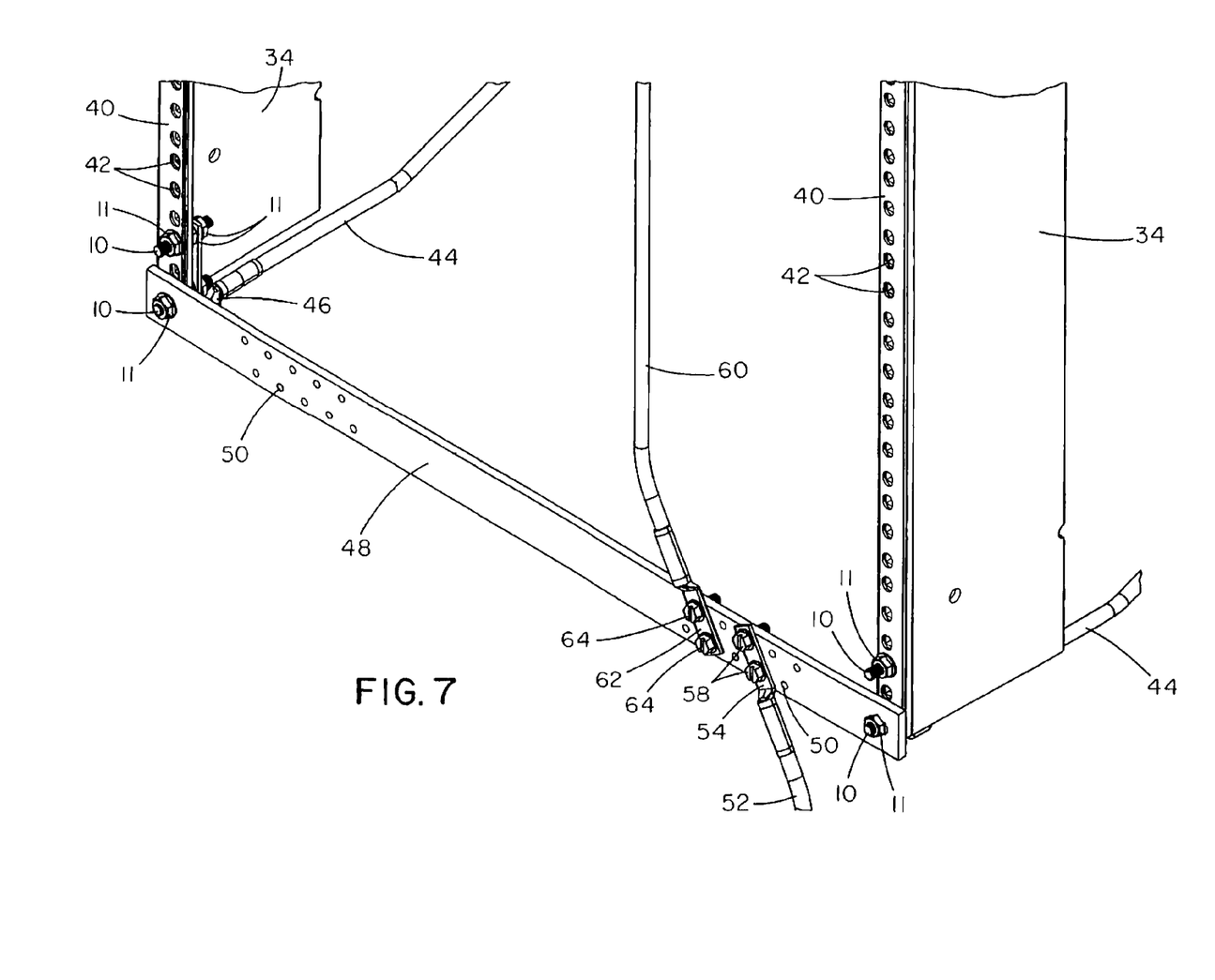
FIG. 7 is an enlarged partial rear perspective view of the data center cabinet of FIG. 4.
Figure 8:
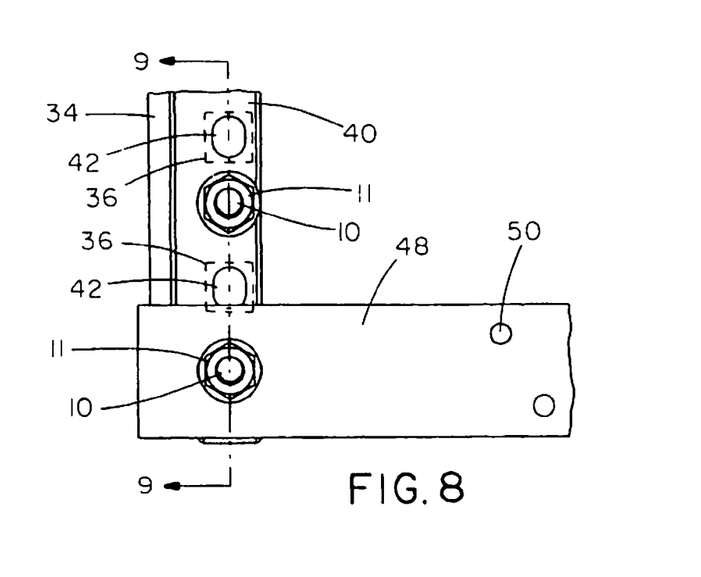
FIG. 8 is an enlarged partial rear elevation view of the data center cabinet of FIG. 4.
Figure 9:
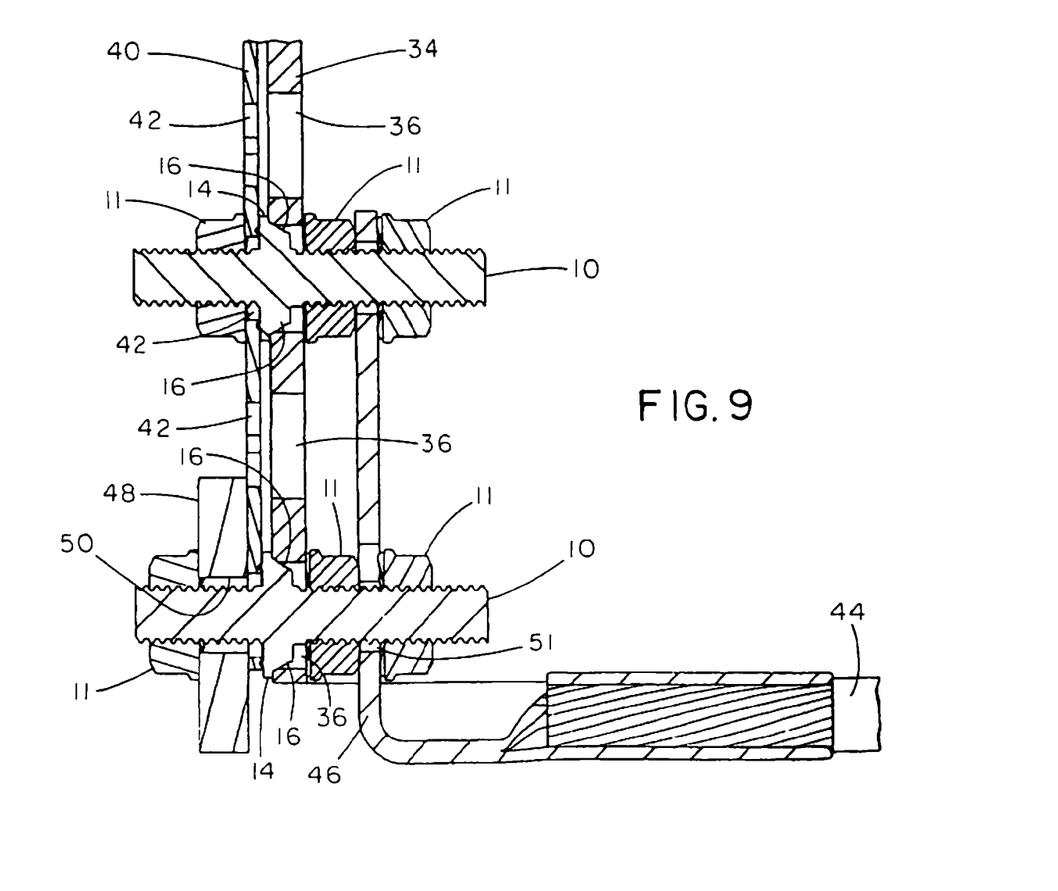
FIG. 9 is a cross-sectional view of the data center cabinet taken along line 9-9 in FIG. 8.

As shown in FIG. 5, to connect and bond jumper wires 44 to front and rear frame rails 32 and 34, first threaded studs 18 are inserted through cage nut holes 36. Once body 12 is aligned with cage nut holes 36, bonding nuts 11 are then threaded onto first threaded studs 18 until annular shoulder 14 contacts the equipment rail, to secure bonding studs 10 to front and back frame rails 32 and 34. Terminal ends 46 are then inserted over first threaded studs 18 until they stop against bonding nuts 11.

The common geometric shape between body 12 and cage nut holes 36 helps prevent rotation of bonding stud 10, as bonding nuts 11 are tightened. In addition, as bonding nuts 11 are tightened, cutting surface 19 of projections 16 bites into front and rear frame rails 32 and 34 and through any paint thereon, to bond front and back frame rails 32 and 34 to bonding studs 10. Bonding nuts 11 may also include teeth-like projections (not shown), which can also cut into front and back frame rails 32 and 34, to provide a further bonding connection.

Second threaded stud 20 may be used to install copper ground strip 40, to overlie a portion of front and rear frame rails 32 and 34 and to secure ground bar 48 to rear frame rails 34. Ground strip 40 is constructed of copper and comprises apertures 42 positioned at the same intervals as cage nut holes 36 in front and rear frame rails 32 and 34. Second threaded stud 20 may be inserted through apertures 42 in ground strip 40, so that ground strip 40 lies flat against annular shoulder 14, and through cage nut mating apertures 49 in ground bar 48. Bonding nuts 11 may be threaded onto second threaded studs 20 to secure ground strip 40 and ground bar 48 into position. As discussed above, bonding nuts 11 may include teeth-like projections, which cut into ground strip 40 and ground bar 48 for enhanced bonding.

Second threaded stud 20 may also be used to secure equipment 38 to front and rear frame rails 32 and 34. Second threaded stud 20 may be threaded through apertures (not shown) in equipment mounting flange 37, followed by attachment of bonding nut 11 thereto. In this way, equipment 38 can be mounted directly over front to rear jumper wire 44 connections and elsewhere without sacrificing a rack unit. Further, edge 17 of annular rib 15 can cut into equipment mounting flange 37 to enhance electrical conductivity.

The foregoing connections establish electrical continuity between the various components of cabinet 30. For example, front to back jumper wire 44 provides an electrical connection between front frame rails 32, their corresponding ground strips 40 and rear frame rails 34. Ground bar 48, in conjunction with grounding strips 40 and bonding studs 10, establishes and maintains an electrical connection between opposing rear frame rails 34.

To further enhance electrical connections throughout cabinet 30, ground wires 52 and equipment jumper wires 60, shown in FIGS. 4 and 5, may be employed. Ground wires 52 may be employed to connect ground bar 48 to common bonding network 56 through terminals 54 on ground wires 52. Equipment jumper wires 60 may be employed to connect equipment 38 to at least one of ground strip 40 and ground bar 48 through terminals 62 on equipment jumper wires 60. Similar to terminal ends 46 of jumper wires 44, terminals 54 and 62 include apertures (not shown) for receiving fasteners. To connect and bond ground wires 52 to ground bar 48, screws 58 are inserted through these apertures and threaded into threaded holes 50 in ground bar 48. Likewise, to connect equipment jumper wires 60 to one or both of ground strip 40 and ground bar 48, screws 64 are inserted through the apertures and threaded into threaded holes in equipment 38, as seen in FIG. 4. The heads of screws 58 may also include teeth-like projections on their underside to cut into terminals 54 and 62 and provide an electrical bond therebetween.

Finally a warning label can be placed on rear frame rails 34 near bonding studs 10 to provide visibility to the ground system. The warning label could be colored to stand out, providing visual verification of the need for grounding. Similarly, bonding stud 10 is typically colored green to indicate that it is a grounding device.

The invention claimed is:

1. A bonding stud comprising:
   a body having a first threaded stud extending from a first surface of the body and a second threaded stud extending from a second surface of the body, wherein the body has a square-shaped cross-section;
   the body further having a stop surface extending outwardly from the body and at least one projection, the at least one projection includes a first surface in contact with the body and a second surface in contact with the stop surface.

2. The bonding stud of claim 1, wherein the body is dimensioned to geometrically conform to a cage nut hole within a data center cabinet.

3. The bonding stud of claim 1, wherein the stop surface is an annular shoulder.

4. The bonding stud of claim 3, wherein the annular shoulder has an annular rib extending from the annular shoulder.

5. The bonding stud of claim 1, wherein the at least one projection is positioned between the first and second threaded studs.

6. The bonding stud of claim 1, wherein the body has four sides and each side includes between one and three projections.

7. The bonding stud of claim 1, wherein the at least one projection comprises between four and twelve projections.

8. The bonding stud of claim 1, wherein the at least one projection comprises a tooth having a cutting surface.

9. The bonding stud of claim 1, wherein the at least one projection has a triangular-shaped cross-section.

* * * * *